(12) United States Patent
Yu et al.

(10) Patent No.: US 7,728,577 B2
(45) Date of Patent: Jun. 1, 2010

(54) AUTOMATIC CURRENT TRIMMING METHOD AND CIRCUITS

(75) Inventors: Jane Xiaoying Yu, Saratoga, CA (US); Baohong Cheng, San Jose, CA (US)

(73) Assignee: Vimicro Corporation, Beijing (CN)

( * ) Notice: Subject to any disclaimer, the term of this patent is extended or adjusted under 35 U.S.C. 154(b) by 536 days.

(21) Appl. No.: 11/778,022

(22) Filed: Jul. 14, 2007

(65) Prior Publication Data
US 2008/0238398 A1    Oct. 2, 2008

(51) Int. Cl.
G01R 13/02 (2006.01)
G09G 3/30 (2006.01)
G09G 3/32 (2006.01)

(52) U.S. Cl. .................. 324/76.83; 345/77; 345/82
(58) Field of Classification Search ............... 324/76.83; 345/77, 82
See application file for complete search history.

(56) References Cited

U.S. PATENT DOCUMENTS 3,760,269 A * 9/1973 Beeman et al. .......... 324/76.57
3,909,788 A * 9/1975 Kaelin et al. ................. 345/83
2007/0222721 A1 * 9/2007 Yagi ............................ 345/82

* cited by examiner

*Primary Examiner*—Amy He
(74) *Attorney, Agent, or Firm*—Wuxi Sino-US IP Agency, Ltd; Joe Zheng

(57) ABSTRACT

Techniques pertaining to device and method for controlling an analog signal are disclosed. Using a single connection (e.g., a connector or a pin) without an external resistive element (e.g., a resistor), an analog output is digitally controlled and produced. In one embodiment, a precisely controlled current is generated from coded data. A control unit is designed to control a working mode based on an input signal from the connection. The working mode includes a default mode, a programmable mode, a testing mode and a shutdown mode. Under the programmable mode, a user determines a signal coupled in from the connection as desired, and a code unit codes the signal in accordance with a predefined protocol. The code unit then sends the coded data to a decode unit. The decode unit is designed to generate or control the current by the decoded data.

17 Claims, 3 Drawing Sheets

Analog signal controlling device

Analog signal controlling device

| code | Iout(mA) | code | Iout(mA) | code | Iout(mA) | code | Iout(mA) |
|---|---|---|---|---|---|---|---|
| 0 | 0 | 8 | 2 | 16 | 7 | 24 | 15 |
| 1 | 0.25 | 9 | 2.5 | 17 | 8 | 25 | 16 |
| 2 | 0.5 | 10 | 3 | 18 | 9 | 26 | 17 |
| 3 | 0.75 | 11 | 3.5 | 19 | 10 | 27 | 18 |
| 4 | 1 | 12 | 4 | 20 | 11 | 28 | 19 |
| 5 | 1.25 | 13 | 4.5 | 21 | 12 | 29 | 20 |
| 6 | 1.5 | 14 | 5 | 22 | 13 | 30 | 21 |
| 7 | 1.75 | 15 | 6 | 23 | 14 | 31 | 22 |

Fig. 3

AUTOMATIC CURRENT TRIMMING METHOD AND CIRCUITS

BACKGROUND OF THE INVENTION

1. Field of the Invention

The present invention relates to the area of integrated circuit, and more particularly to device and method for controlling an analog signal via a single connection (e.g., a connector or a pin).

2. Description of Related Art

A light-emitting diode (LED) is a semiconductor device that emits incoherent narrow-spectrum light when electrically biased in the forward direction of the p-n junction. This effect is a form of electroluminescence. An LED is a small area source with extra optics added to the chip that makes it emit a certain radiation pattern. The color of the emitted light depends on the composition and condition of the semiconducting material used, and can be infrared, visible or near-ultraviolet.

LEDs are commonly used as a lighting source in applications. It is commonly known that a current going through an LED controls the brightness of the emitting light from the LED. However, unlike incandescent light bulbs, which light up regardless of the electrical polarity, LEDs will only light with positive electrical polarity. When the voltage across the p-n junction is in the correct direction, a significant current flows and the device is said to be forward-biased, thus emitting light. If the voltage is of the wrong polarity, the device is said to be reverse biased, very little current flows, thus no light is emitted.

Because the voltage versus current characteristics of an LED are much like any diode (that is, current approximately an exponential function of voltage), a small voltage change results in a huge change in current, resulting in brightness variations of the LED. Changes in brightness, if not so designed, are not desirable. Accordingly, there is a need for control circuit that is able to regulate a voltage applied across an LED to keep a constant current flowing an LED.

Most of the prior art methods use a current source and an external resistor to modulate the value of a current going through an LED. It has been noticed that the external resistor may introduce various undesirable side-effects. Therefore, there is a need for techniques for generating a precisely controlled current to be applied to an LED without an external element.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

The present invention pertains to device and method for controlling an analog signal via a single connection (e.g., a connector or a pin) without an external resistive element (e.g., a resistor). According to one aspect of the present invention, a precisely controlled current is generated from coded data. A control unit is designed to control a working mode based on an input signal from the connection. In one embodiment, the working mode includes a default mode, a programmable mode, a testing mode and a shutdown mode. Under the programmable mode, a user determines a signal coupled in from the connection as desired, and a code unit codes the signal in accordance with a predefined protocol. The code unit then sends the coded data to a decode unit. The decode unit is designed to generate or control a current by the decoded data.

The present invention may be implemented in different ways, including an integrated circuit (IC), a discrete circuit or a part of a system. According to one embodiment, the present invention is a device for controlling an analog signal, the device comprises a controlling unit including a first one-shot timer providing a first time period, and a second one-shot timer providing a second time period, the controlling unit determining whether a signal changes from a default state, if yes, then determining whether the signal changes back to the default state when the first time period ends, if yes again, the controlling unit counting a number of pulses in the signal during the second time period. The device further comprises a code unit provided to latch the number and code the number to produce a code; and a decode unit provided to decode the code and subsequently output the analog signal.

There are numerous objects, features, and advantages in the present invention. These objects, features, and advantages will become apparent upon examining the following detailed description of various embodiments thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3 is an exemplary decoding table used in one embodiment of the present invention.

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

Figure 1:
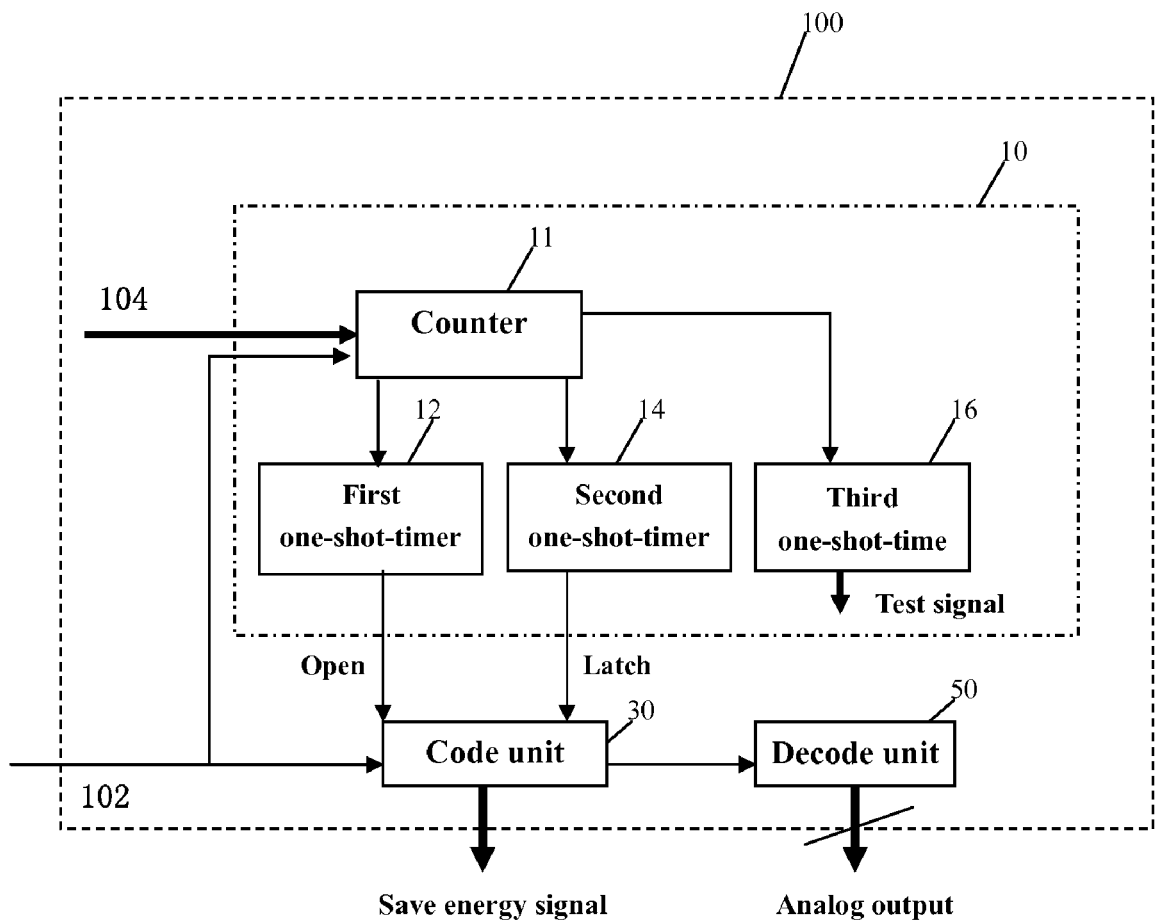
FIG. 1 shows an exemplary functional block diagram of controlling an analog signal, according to one embodiment of the present invention.

Embodiments of the present invention are discussed herein with reference to FIGS. 1A-3. However, those skilled in the art will readily appreciate that the detailed description given herein with respect to these figures is for explanatory purposes only as the invention extends beyond these limited embodiments. FIG. 1 is a functional block diagram 100 of controlling an analog signal according to one embodiment of the present invention. To facilitate the description of the present invention, the diagram 100, which may be implemented in an integrated circuit (IC) as an analog signal controlling device, is described herein to control the brightness of a white LED (or WLED, not shown).

In this example, the analog signal controlling device 100 utilizes an input coupled to a connection (referred to herein as a data/controlling single pin 102) to control the brightness of WLED. In one embodiment, the input signal coupled to the data/controlling single pin 102 is a sequence of pulses. As shown in FIG. 1, the analog signal controlling device 100 contains a controlling unit 10, a code unit 30 and a decode unit 50.

The control unit 10 is used to control working modes of the analog signal controlling device 100 based on the input signal from the data/controlling single pin 102. In one embodiment, the working mode includes a default mode, a programmable mode, a testing mode and a shutdown mode. Under the programmable mode, a user determines a signal from the data/controlling single pin 102 as desired, and the code unit 30 codes the signal from the data/controlling single pin 102 in accordance with a predefined protocol. Then the code unit 30 sends the coded data to the decode unit 50. The decode unit 50 is designed to control the current flowing through the WLED by the decoded data, thus controlling the brightness of the WLED. The code and decode protocols will be described below. Accordingly, the user could control the brightness of a WLED by setting up the signal coupled to the data/controlling single pin 102.

Under the testing mode, the analog signal controlling device 100 is put into a test mode so that various tests may be performed. Under the shutdown mode, all of the blocks in FIG. 1 are shut down, the output of decode unit 50 outputs nothing or very little current signal. In order to make the whole device working reliably, the analog signal controlling device 100 stops any other modes once it enters a certain mode, which also saves energy.

In one embodiment, the controlling unit 10 comprises a first one-shot timer 12 which determines a T1 time period, a second one-shot timer 14 which determines a T2 time period and a third one-shot timer 16 which determines a T3 time period. The controlling unit 10 also comprises an internal clock 104 providing a clock signal and a counter 11 which is designed to provide a precise time for each of the timers. Depending on implementation, T1, T2 and T3 may be changed. In one embodiment, T1=100 us, T2=100 ms and T3=300 us.

Figure 2:
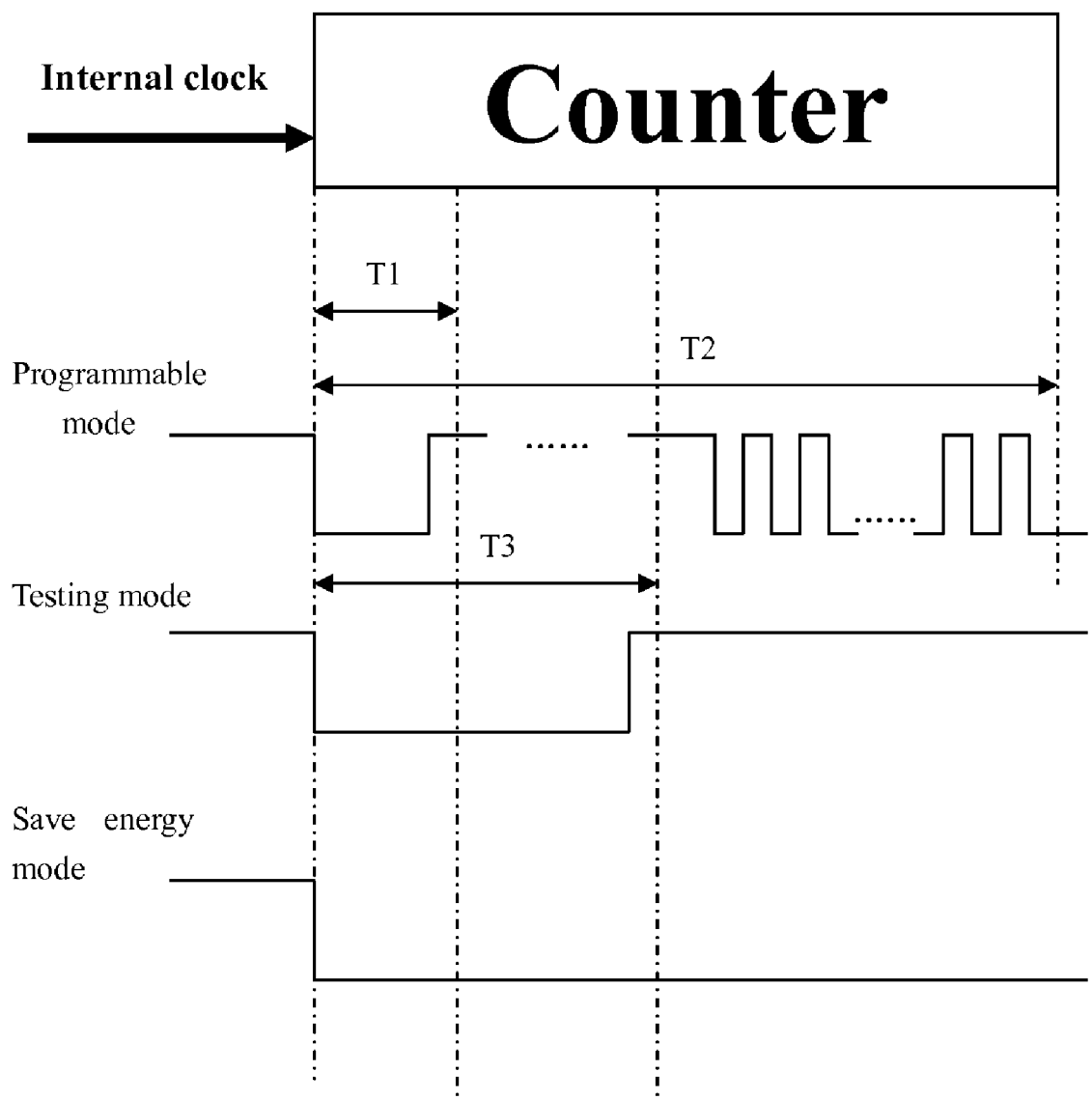
FIG. 2 shows a logic timing sequence diagram used to control the operation of an analog signal controlling device employing one embodiment of the present invention.

FIG. 2 shows a logic timing sequence diagram that may be used in the analog signal controlling device 100 of FIG. 1. In the beginning, a signal to the data/controlling single pin 102 is assumed to be high (or low), and this status is also assumed to be a default status. At this time point, the analog signal controlling device 100 is in a default mode. The counter 11 begins to time upon the input of the data/controlling single pin 102 changing to low from high. The analog signal controlling device 100 judges whether the input of the data/controlling single pin 102 jumps from low to high when the first one-shot timer 12 finishes the timing. If it is indeed the case, the code unit 10 is enabled and makes the analog signal controlling device 100 enter the programmable mode and at the same time shuts down any other modes.

Under the programmable mode, a user may provide a signal including a certain number of pulses as an input signal through the data/controlling single pin 102. The decode unit 30 counts the number of edges (down or up) of the input signal, and at the same time the counter 11 continues the counting. A second one-shot timer 14 sends a latch signal to the code unit 30 to latch the counted result when the second one-shot timer 14 claims when the T2 time period ends. At the same time, the input of the data/controlling single pin 102 returns to high and resets the counter 11. Then, the code unit 30 codes the latched result using the predefined code protocol, and then sends the coded data to the decode unit 50. At the same time, the analog signal controlling device 100 returns to the default mode from the programmable mode, and shutdown any other modes.

If the input of the data/controlling single pin 102 does not jump to high from low when the first one-shot timer claims that T1 time period ends, there will be a flip-latch which is not shown in FIG. 2 to latch this status. The counter 11 continues to determine the T3 time period for the third one-shot timer. The analog signal controlling device 100 turns to a testing mode from the default mode if the input signal of the data/controlling single pin 102 has changed from low to high before T3 ends, and of cause the latch had recorded that the analog signal controlling device 100 that has not entered the programmable mode. At the same time, the counter 11 is reset. When the testing mode finishes, the input of the data/controlling single pin 102 returns to high, the analog signal controlling device 100 changes to the default mode from the testing mode, and shuts down any other mode.

The analog signal controlling device 100 enters the shutdown mode and closes any other mode if the input signal of the data/controlling single pin 102 does not change to high before the T3 time period ends. It may be appreciated that, when there is a change from one mode to another, any other mode is caused to be shut down, thus the analog signal controlling device 100 would not jump from one mode to another, which increases the inherent anti-noise ability.

Once the analog signal controlling device 100 enters the programmable mode, in one embodiment, the decode unit 30 starts to count a number of the downward (negative) edges in the input signal during the T2 time period. Upon receiving the latch signal, the code unit 30 latches the statistical result and codes it by means of each two downward edges corresponding to one code number. For example, no downward edge and one downward edge are coded as 0, 2 and 3 downward edges are coded as 1, ... and 62 and 63 downward edges are coded as code 31. The number of pulses in the input signal at the data/controlling single pin 102 is determined by the user's requirement. Of cause in other cases it could count the upward (positive) edge and follow the same code protocol. It should be noted that every pair of two downward edges corresponding to a code is not unique. The number of downward edges could be determined by the user's requirement, for example, every 3, 4 and even more downward edges correspond to one code.

Then the code unit 30 sends the coded result to the decode unit 50, and the decode unit 50 decodes it by the means of a decode protocol, an example of which is shown in FIG. 3. The decode protocol shown in FIG. 3 is piecewise linear, in which code 0 is decoded to 0 mA, code 1 is decoded to 0.25 mA ... code 8 is decoded to 2 mA, ... and code 31 is decoded to 22 mA. It may be noticed that, in the embodiment, the decode protocol is piecewise linear with a step width 0.25 mA before code 8, and a step width 0.5 mA between code 8 and code 14, and a step width 1.00 mA all the way to code 31. Depending on a specific requirement, the step width may be altered as required. In addition, the decode protocol could be reversed as well, such as code 0 is decoded as 22 mA, code 1 as 21 mA . . . and code 31 as 0 mA.

The output of the decode unit 50 is a current signal, for example, to drive the WLED. With one embodiment of the present invention, a user could control the brightness of the WLED by controlling the decode unit 50 in terms of setting up the input pulse number coupled to the data/controlling single pin 102 during the T2 time period.

Each time a user could set the input pulse number to control the current flowing through the WLED, so the user could control the current flowing through the WLED either in serial that is to increase or decrease the current continuously or in increments/decrements, for example, set the current from 0 mA directly to 22 mA. In one perspective, the present invention makes the control of a current flexible.

As describe above, every two downward edges are correspond to a code, which increase the inherently anti-noise ability. In addition, the data/controlling single pin 102 works both as a control input and as a data input, so it saves the pin number of an integrated circuit employing one embodiment of the present invention, so as to save the cost thereof.

The input of the data/controlling single pin 102 could be set with a serial peripheral interface or micro-controller.

The above description uses an WLED as an example, those skilled in the art may appreciate that the present invention may be equally applicable to controlling other types of LEDs, such as OLED or other kinds of LED, where there needs a logically controlled current source. One of the important features in the present invention is that a controlled current can be realized without using an external resistor. Those skilled in the art can appreciate that the present invention may be used in any applications that require a logically controlled current source or a logically controlled analog signal.

The present invention also provides an analog signal controlling method. This method could be utilized in an analog signal controlling device. In one embodiment, the analog signal controlling method includes the following operations: causing an input signal coupled to a data/controlling single pin 102 to jump from one state to another state (e.g., from high to low); judging whether the data/controlling single pin 102 jumps to high after the first one-shot timer claims that the T1 time period ends.

When T1 ends, the code unit counts the downward edges in the input signal at the data/controlling single pin during the T2 time period determined by the second one-shot timer. The counted result is then latched and coded in accordance with a predefined protocol that each two downward edges counterpart to one code and send the result to a decode unit. The decode unit decodes the coded result into an analog signal output by the decode protocol shown in FIG. 3.

Referring back to the situation where if the judgment result is no, then the device enters the shutdown mode, or continuously judges whether it returns to high when the T3 time period ends. If yes, it enters the testing mode; if no, stops all functional blocks.

The foregoing description of embodiments is illustrative of various aspects/embodiments of the present invention. Various modifications to the preferred embodiments can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A device for controlling an analog signal, the device comprising:
    a controlling unit including a first one-shot timer providing a first time period, and a second one-shot timer providing a second time period, the controlling unit determining whether a signal changes from a default state, if yes, then determining whether the signal changes back to the default state when the first time period ends, if yes again, the controlling unit counting a number of pulses in the signal during the second time period;
    a code unit provided to latch the number and code the number to produce coded data; and
    a decode unit provided to decode the coded data and subsequently output the analog signal.

2. The device as claimed in claim 1, wherein the analog signal is so generated without using an external resistor.

3. The device as claimed in claim 2, wherein the controlling unit operates in the default mode, a programmable mode, a testing mode and a shutdown mode.

4. The device as claimed in claim 3, wherein, in the programmable mode, the signal coupled in from a single pin is determined as desired, and the code unit codes the signal in accordance with a predefined protocol.

5. The device as claimed in claim 4, wherein the code unit is designed to send the coded data to the decode unit that is designed to control the analog signal by decoding the coded data in accordance with a decoding protocol.

6. The device as claimed in claim 5, wherein the signal is coupled to a connector of the device, and the analog signal is coupled to an LED, thus brightness of the LED can be controlled by controlling the signal.

7. The device as claimed in claim 6, the connector is used for both data and a control signal so as to save a number of connectors of the device.

8. The device as claimed in claim 2, wherein the controlling unit includes a third one-shot timer providing a third time period, If the signal does not change back to the default state after the first time period, and changes back to the default state during the third time period, the device enters a testing mode.

9. The device as claimed in claim 8, wherein the controlling unit further comprises a counter for counting time precisely for each of the first, second and third one-shot timers.

10. The device as claimed in claim 9, wherein if the signal does not change back to the default state during the third time period, all modules are automatically shut down.

11. The device as claimed in claim 1, wherein the decode unit decodes the coded data in accordance with a decode protocol.

12. The device as claimed in claim 11, wherein the decode protocol is piecewise linear.

13. The device as claimed in claim 1, wherein the analog signal is a current or a voltage signal.

14. A method for controlling an analog signal, the method comprising:
    changing an input signal from a default state, the input signal including a sequence of pulses;
    judging whether the input signal changes back to the default state during a first time period;
    if yes, counting a number of the pulses in the input signal during a second time period;
    latching the number and coding the number to produce coded data; and
    decoding the coded data and outputting the analog signal.

15. The method as claimed in claim 14, further comprising stopping all functional modules If the input signal does not change back to the default state during the first time period.

16. The method as claimed in claim 15, further comprising changing back to the default state during a third time period, and entering a testing mode.

17. The method as claimed in claim 16, wherein the first, the second and the third time period are determined by three one-shot timers individually.

\* \* \* \* \*